Patented Feb. 4, 1941

2,230,417

UNITED STATES PATENT OFFICE 2,230,417

CEREAL FLOUR AND METHOD OF MAKING THE SAME

Frank G. Wellinghoff, St. Louis, Mo.

No Drawing. Application March 2, 1938,
Serial No. 193,440

4 Claims. (Cl. 99—93)

This invention relates to a certain new and useful improvement in cereal flours and to the method of making the same.

In the present-day milling processes, so far as I am aware, cereals or grains, such as wheat, rye, and the like, are first cleaned for removing included foreign matter, such as dirt and dust, by aspiration.

The cleaned grain is then further cleaned by scouring, for which operation a variety of different types of machines are available, depending upon the character of the grain. The scouring operation, broadly speaking involves the placing of the grain in a suitable revolvable drum equipped upon its inner peripheral face with serrations or abrasive elements for rubbing off, as it may be termed, the external dirt and physically adhering matter on the grain particles as such particles are whirled or agitated during drum rotation.

Now, in the case of wheat, the grain particles originally comprise an outer husk or shell, which, at one end, has outwardly extending fibrous projections commonly known as "hairs," and, at the other end, has a closely underlying relatively small body of oily material, known as the wheat germ.

The main bulk of the wheat particle housed within the shell or husk is the endosperm or starch constituent, which forms the body of the milled flour, the shell, hair, and germ being eliminated to a greater or lesser degree, depending upon the type of flour being manufactured. In the case of whole-wheat flour, for instance, the shell and germ may be permitted to remain and be ground together with the endosperm. In the production of high-grade flour, on the other hand, the shell, hair, and germ are eliminated as completely as possible.

After cleaning and scouring, the wheat is tempered to the desired degree and then fed into the first grinding rolls. The first grinding, in the early days of milling, was usually the main reducing operation, and an effort was made to obtain a maximum yield of flour at this point. Modern processes, however, strive for just the opposite result. Every effort is made to secure an absolute minimum of flour production in this grinding operation. It is merely desired to crack open the wheat kernel and, in a sense, peel out the endosperm or starch constituent from the germ and husk without reducing any of such particles to smaller size than is absolutely necessary, thus forming cracked grain or semolina, as it is called.

The semolina is then fed into the purifiers, which, by sieving and aspirating, physically separate the endosperm or starch constituent from the husks and germ as completely as possible. The husk or bran, as it is now called, usually contains the major portion of the wheat germ, although a relatively small percentage of bran and wheat germ pass into the subsequent stages of the flour process as a matter of unavoidable accident.

The purified endosperm or starch constituent is then passed through any number of subsequent grinding and bolting operations for the production of a pure flour of any desired degree of fineness.

The inclusion of the germ of the wheat and bran in the finished product results in a highly undesirable off-white coloration and in an excessive oil content, which latter produces flour rancidity and unsoundness. It will hence be evident that every effort is now made to avoid the inclusion of the wheat germ in the finished flour product, this same problem arising substantially in a like manner in connection with other cereal flours.

The now generally removed wheat-germ embodies, however, important elements of the grain-particle, and I have discovered that cereal flours may be greatly improved as to taste, baking and keeping qualities, and dietetic properties by the inclusion therein of the wheat germ minus its deleterious oily element.

My present invention accordingly has for its object and resides in the provision economically, as a new article of manufacture, of a cereal flour possessing all of the properties of present high-grade flour, as well as also all of the properties imparted through the inclusion or admixture therein of the oil-removed or extracted wheat-germ.

According to my method of flour-production, the harvested wheat or other cereal grains are suitably, following substantially present-day milling operations, treated for the removal of the bran and wheat-germ and then grinding to desired flour-fineness of the remaining wheat-kernel.

The removed or separated germ is now suitably treated with volatile solvents or other extractive methods for extracting substantially all of its oily elements, leaving a residue which embodies the nutrient and vitamin-containing leucosine, globulin, and neuclein normally present in the wheat-germ, as well as a small amount of undesirable fibrous matter and bran particles. This residue, after being dried and, if desired, sterilized, is suitably ground or pulverized and then passed through a reel or other type of sifting device for separating the fibrous matter and bran particles. The purified germ residue is then in condition for re-introduction into the flour stream for further milling with the flour.

In the event that it is desired to manufacture a white flour such as, for instance, so-called "patent" flours, the endosperm or starchy portions of the grain, which have, as stated, been separated in the milling of the grain from the bran and germ, are passed through the grinding rolls of the mill for reduction to flour, and, at any desired point in such grinding operation, the oil-free, dry germ-residue may be introduced into the flour.

If it is desired to produce a flour other than white flour, such as, for instance, flours of the whole-wheat type, the bran portions originally separated during the milling operation may be separately ground in an attrition mill and added, together with the oil-free germ-residue, to the ground endosperm at any desired point in the grinding operation.

Ordinarily, it is preferable to introduce the oil-free germ-residue into the flour in substantially the same proportions by weight which it would bear to the flour if the wheat germ had not been initially separated or removed therefrom. However, if flour having an unusually high vitamin-content for special dietetic purposes is desired, then, as will be understood, an excess or greater amount of the oil-free germ-residue may be utilized.

Cereal flours manufactured in accordance with my invention have been found by actual test to possess in a great degree qualities and properties absent from present commercial flour of the highest type.

First, the keeping qualities and soundness of the flour are increased many times.

Then, the food value of the flour is largely increased by reason of the presence in the treated flour of vitamins which are normally absent in present commercially milled flours, such as patents and straights, and the taste, flavor, and assimilative properties of the produced food-products are, in turn, greatly increased by reason of the presence of certain unidentified elements of the germ, which, in nature, are designed to produce ready assimilation of the starch or endosperm for the benefit and nourishment of the wheat plant which would grow therefrom if the wheat kernel were to be planted as seed.

Further, the baking character of the flour is so advantageously modified that a smaller amount of shortening and less yeast are required and a shorter period of fermentation needed to bring the flour dough into proper condition for baking. Also, the presence of the soluble albumins and globulins is markedly increased in the dough, giving rise to better gas retention during fermentation, which, in turn, improves the texture of the resulting bread or other baked product. The germ proteins, furthermore, increase the moisture-retentive value of the baked bread, producing a better-keeping loaf and one having an improved flavor and more agreeable odor.

Having thus described my invention, what I claim and desire to secure by Letters Patent is—

1. As an article of manufacture, ground wheat flour consisting of a ground admixture of germ and endosperm portions of wheat grains in substantially the proportions of these ingredients in natural wheat grains and with the oil extracted from the germ portion previous to admixing.

2. As a merchantable article of manufacture, wheat flour consisting of a ground admixture of germ and endosperm portions of wheat grains in substantially the proportions of natural wheat grains and with the bran and the oil of the wheat germ portion removed.

3. The method of manufacturing wheat flour comprising, separating the flour forming endosperm from the outer shell and germ of the grain kernels, separating out the shell, extracting the oil from the germ portions, admixing the oil-extracted germ portions with the endosperm portions in substantially the proportions thereof in the natural grain kernels, and then grinding together the mass.

4. The method of manufacturing wheat flour comprising, cleaning the grain, separating the flour forming endosperm from the outer shell and the germ portions of the wheat kernels, separating out and removing the outer shell portions, extracting and removing the oil from the germ portions, separately grinding the oil-free germ portions and the germ-free endosperm portions, and then returning and admixing the germ portions and the endosperm portions together in substantially the proportions in natural wheat grain thereby providing a commercially salable wheat flour consisting of the ingredients of natural grain except for the bran-forming outer shell and the germ oil.

FRANK G. WELLINGHOFF.